US005246359A

United States Patent [19]

Tausk

[11] Patent Number: 5,246,359

[45] Date of Patent: Sep. 21, 1993

[54] APPARATUS FOR MAKING A CASTING HAVING AN INTEGRAL HOSE CONNECTION

[75] Inventor: Edward F. Tausk, Downers Grove, Ill.

[73] Assignee: Navistar International Transporation Corp., Chicago, Ill.

[21] Appl. No.: 938,081

[22] Filed: Aug. 31, 1992

Related U.S. Application Data

[62] Division of Ser. No. 811,762, Dec. 20, 1991, Pat. No. 5,143,143, which is a division of Ser. No. 485,099, Feb. 26, 1990, Pat. No. 5,076,345.

[51] Int. Cl.[5] .......................... B29C 33/10; B22C 7/02

[52] U.S. Cl. ...................................... 425/4 R; 249/98; 249/141; 249/144; 425/470; 425/812; 164/45

[58] Field of Search ........... 425/4 R, 470, 812, 817 R; 249/61, 62, 160, 122, 98, 141, 144; 164/34, 45, 520, 246; 264/221

[56] References Cited

U.S. PATENT DOCUMENTS 4,907,638 3/1990 Hubbell et al. ........................ 164/45
4,964,454 10/1990 Hubbell et al. ..................... 164/246
4,987,945 1/1991 Corbett .............................. 164/235

*Primary Examiner*—Jay H. Woo
*Assistant Examiner*—James P. Mackey
*Attorney, Agent, or Firm*—Dennis K. Sullivan

[57] ABSTRACT

A hose connection element integrally cast as part of a cast structure such as a water outlet conduit for a vehicle engine comprises a tubular structure including a circumferential hose retaining bead with a flawless sealing surface between the bead and a proximal end thereof. A set of three vented tooling elements is used in creating a polystyrene pattern of the cast structure including integral hose connection element including first and second tooling elements to create first and second half-sections of a for a body portion pattern. The first and second tooling elements include a recess at one end thereof to form a socket depression in the body portion. The third tooling element comprises a cylindrical cavity including an outer wall and an inner wall, with the outer wall being uninterrupted by vent openings and including a circumferential area of protruberance near one end thereof, the parting line for the third tooling element being positioned along a crest of the protuberance.

6 Claims, 2 Drawing Sheets

APPARATUS FOR MAKING A CASTING HAVING AN INTEGRAL HOSE CONNECTION

This is a division of application Ser. No. 811,762, filed Dec. 20, 1991, now U.S. Pat. No. 5,143,143, which is a division of application Ser. No. 485,099, filed Feb. 26, 1990, now U.S. Pat. No. 5,076,345.

BACKGROUND OF THE INVENTION

The present invention relates to a cast tubular structure, such as engine water inlet and outlet fittings or a turbocharged engine intake manifold, including an integral cast hose connection element having a hose sealing surface which, as cast, is concentric, smooth, and free of glue joint beads, parting lines, and vent opening dimples as well as to the method and tooling elements used in its manufacture.

THE PRIOR ART

Presently, cast structures, such as a water inlet or outlet fittings for a vehicle engine, including a hose connection element of the type disclosed herein, are produced by use of a lost foam casting process.

In such lost foam (evaporative pattern) casting process, patterns are produced by blowing expanded polystyrene beads into aluminum tooling elements which are typically vented on all surfaces. Steam is then injected into the cavity of the tooling elements to expand the beads so that they flatten against the tooling element surfaces and adhere to one another. After cooling, the foam pattern sections formed in this manner are ejected from the tooling elements.

Typically, the cast structure has been formed from two pattern half-sections, which are glued together, for example, when dealing with a curved structure, along a parting line running longitudinally adjacent the tubular passage thereof. A gate or gating system, comprising a piece of foam, may be formed as a separate structure which is glued to the joined foam pattern sections to form a path or orifice through which molten metal will be poured into the mold to be produced, filling the foam filled cavity of the mold during a later step in this process, after which it will become a "handle" for the cast structure, to be removed and discarded as scrap.

Such multi-component foam patterns, along with foam gating systems used therewith, are assembled with special contact adhesives. The pattern/gating assembly formed thereby is coated, usually by dipping into a permeable clay slurry coating, and then air dried (or oven dried) at 140° F. or less.

The coated pattern/gating assembly, the coating of which will line the final mold, is then positioned within a steel flask and unbonded sand is poured into the steel flask around the assembly while the flask is machine-vibrated to compact the sand and fill any hidden cavities. Part of the gating system of the mold is left protruding during this step.

After filling the flask with sand, the surface coating is removed from the protruding part of the gating, forming an orifice or path via which molten metal may be poured into the foam-filled interior of the mold within the coating. The molten metal is then poured into the mold, via the gate or gating system, vaporizing the foam pattern within the mold and allowing the molten metal to fill the mold cavity. The dried slurry coating around the foam pattern/gating assembly not only provides a mold surface which precisely duplicates the surface of the foam pattern but also prevents the molten metal from contacting the sand therearound.

Once the molten metal cools and solidifies, the formed casting is removed from the sand and the coating is removed therefrom with the gating system being removed and discarded. Since the molten metal was insulated from direct contact with the sand by the coating, embedding of sand particles into the casting surface is eliminated, and, with the exception of molding vent dimples and glue joint beads, the resultant casting surface is flat and smooth.

It will be understood that during the process described above, when blowing the polystyrene beads into the tooling element, it has been expedient to provide vent openings on all surfaces of the tooling element to allow the air used to blow the polystyrene beads into the tooling element to vent therethrough, so that the polystyrene beads are tightly packed into the tooling element. A drawback of using this expedient is that the beads tend to pack into the vent openings, resulting in raised dimples on the foam pattern surface in the location of each vent opening. Consequently, such raised dimples appear on the surface of the finished casting as well, forming potential leak paths therealong, particularly on the external hose sealing surface area of the hose connection element. Also, since the tooling elements used typically provide a two section pattern, seams or glue joint beads are also formed along the parting lines on opposite surfaces of the pattern after the sections are joined together, defining further potential leak paths, again significant in the hose sealing surface area of the hose connection element. Previously, to assure reliable sealing when the casting was subsequently installed on the engine and filled with water, either in an engine test cell or on the vehicle, such dimples, seams, and beads would have to be ground off the hose sealing surfaces of the casting. Exceesive grinding, however, can result in an out-of-round condition of the sealing surface and produce another potential leakage path.

SUMMARY OF THE INVENTION

As will be defined in greater detail hereinafter, the casting including the cast hose connection element of the present invention is formed in such a manner that vent opening dimples are only present on the inside surface of the hose connection element and further that the pattern for the hose connection element is molded separately as a single seamless unit, and is glued to the pattern sections which will eventually produce the rest of the casting. The completed pattern/gating assembly is then dipped into the clay slurry, dried and inserted into the flask for casting of the cast structure including the hose connection element of the present invention. As a result, the external hose sealing surface of the cast hose connection element, as cast, will be concentric, smooth, free of surface irregularities due to glue joints, beads, and vent opening dimples, thereby eliminating all potential leak paths.

According to the invention, there is provided a hose connection element which is cast integrally with a cast structure such as a water outlet conduit for a vehicle engine as a tubular structure having a circumferential hose retaining bead positioned slightly adjacent to the hose end thereof wherein the outer surface adjacent the bead is provided with an as cast hose sealing surface which is substantially flawless.

Further according to the invention, there is provided a set of three tooling elements used in creating a polystyrene lost foam casting pattern for a casting having an integral hose connection element. The tooling elements comprise first and second tooling elements used to create a first and second half-section patterns for a body forming portion of the cast structure, such as a water conduit, and a third hose connection forming tooling element. The first and second tooling elements are vented along all surfaces and including an annular recess along a peripheral edge thereof forming a female socket. The third tooling element comprises a cylindrical structure including an uninterrupted outer wall and an inner wall including vent openings thereon, the outer wall further including an annular protuberance disposed thereon adjacent one end thereof. The parting line of this third tooling element lies along the crest of the area of protuberance.

Still further according to the invention, there is provided a method for lost foam casting of a cast structure including an integral hose connection element, the method including the steps of: creating two vented tooling elements used to form half-sections of a pattern of a body portion of the cast structure, each of the tooling elements including a recess forming a semicircular socket half within each pattern half-section to be molded therein to provide a circular socket seat therein of predetermined dimension when the body pattern half-sections are joined together; creating a third tooling element which will provide a pattern for the hose connection element of the cast structure, the third tooling element including vent openings only along a surface thereof defining the inner diameter of said hose connection element; blowing polystyrene foam beads into each of the three tooling elements; injecting hot steam into the three tooling elements to produce the three pattern sections to be utilized in forming the pattern of the cast structure including an integral hose connection element; joining the foam pattern half sections for the body portion and seating the pattern for the hose connection element therein the circular socket seat formed by the joined pattern half-sections to create the pattern for the cast structure including integral hose connection element; creating a gating assembly and joining same to the formed pattern in an appropriate manner; coating the pattern and mos the gating assembly with a clay slurry; allowing the cay slurry to dry around the pattern/gating assembly; placing the coated pattern/gating assembly within a casting flask; filling the flask with sand, while maintaining access to the gating assembly; pouring molten metal into the area within the coating via the gating assembly, the polystyrene pattern therewithin dissolving upon contact with the molten metal; allowing the molten metal to cool within the coating; removing the cast metal structure surrounded by coating from within the flask; removing the coating from the cast structure; and removing the gating assembly from the cast structure.

BRIEF DESCRIPTION OF THE DRAWINGS

Other objects and advantages of the invention will become more apparent upon reading the detailed description thereof and upon reference to the drawings, in which.

DESCRIPTION OF THE PREFERRED EMBODIMENT

Figure 1:
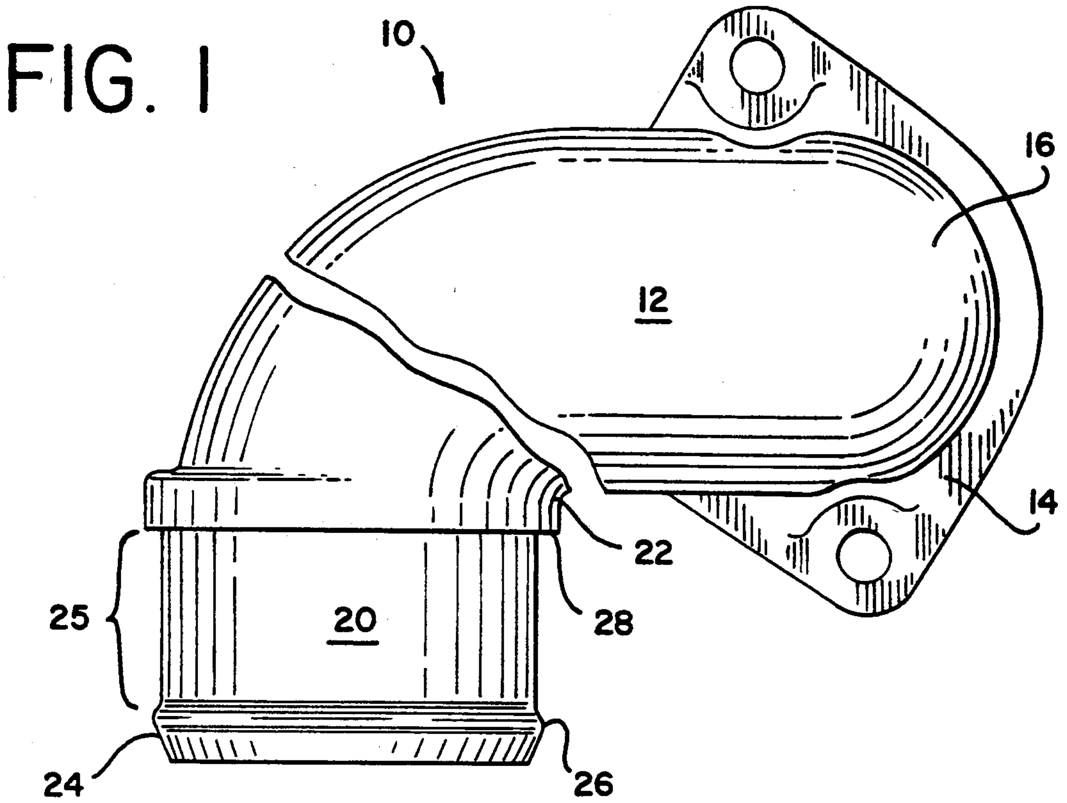
FIG. 1 is a plan view of a cast structure, such as a water inlet or outlet conduit for use in a vehicle engine, incorporating the cast hose connection element with as-cast hose sealing surface of the present invention.

Referring now to the drawings, there is illustrated in FIG. 1 a cast structure 10, such as a water inlet or outlet conduit for use in a vehicle engine (not shown). The cast structure 10 incorporates a body portion 12 including a mounting flange 14 at one end 16 thereof and a hose connection element 20 at the other end 22 thereof. Although the body portion 12 is illustrated in the present embodiment as curved, other body portion shapes are feasible.

As further illustrated, the outer surface 24 of the hose connection element 20 is provided with a hose sealing surface 25 between a hose retainer bead 26 disposed on the surface 24 adjacent the end 22 thereof and a hose abutment flange 28 on the body portion 12. When manufactured in accordance with the improved method of the present invention, the hose sealing surface as cast is smooth, flawless and uninterrupted by seams or dimples. In this respect, the as-cast surface of hose connection elements formed by prior art methods include glue joint beads, seams and vent opening dimples on the outer surface thereof as discussed above. Such interruptions or flaws in the hose sealing surface as cast would cause the formation of leakage paths between such flawed sealing surface and the inner surface of a hose fitted thereover and so the prior methods result in cleaning up the surface as by grinding to eliminate the flaws. A description of the prior art method of forming such cast structures is set forth above and may be used as a foundation upon which the improved method of the invention can be based.

In accordance with the invention, in order to provide a hose connection element 20 having a hose sealing surface 25 which, as cast, has no potential leakage-path-forming interruptions thereon, the hose connection element 20 is patterned as a unitary structure, eliminating glue joint beads from the external or outer surface thereof, and the tooling element forming the hose connection pattern is provided without vent openings in the wall adjacent the external hose sealing surface 25 of the element 20 so that the casting 10, integrally including the hose connection element 20, may be cast with the surface 25 as flawless as possible, without vent opening dimples therein.

Figure 2:
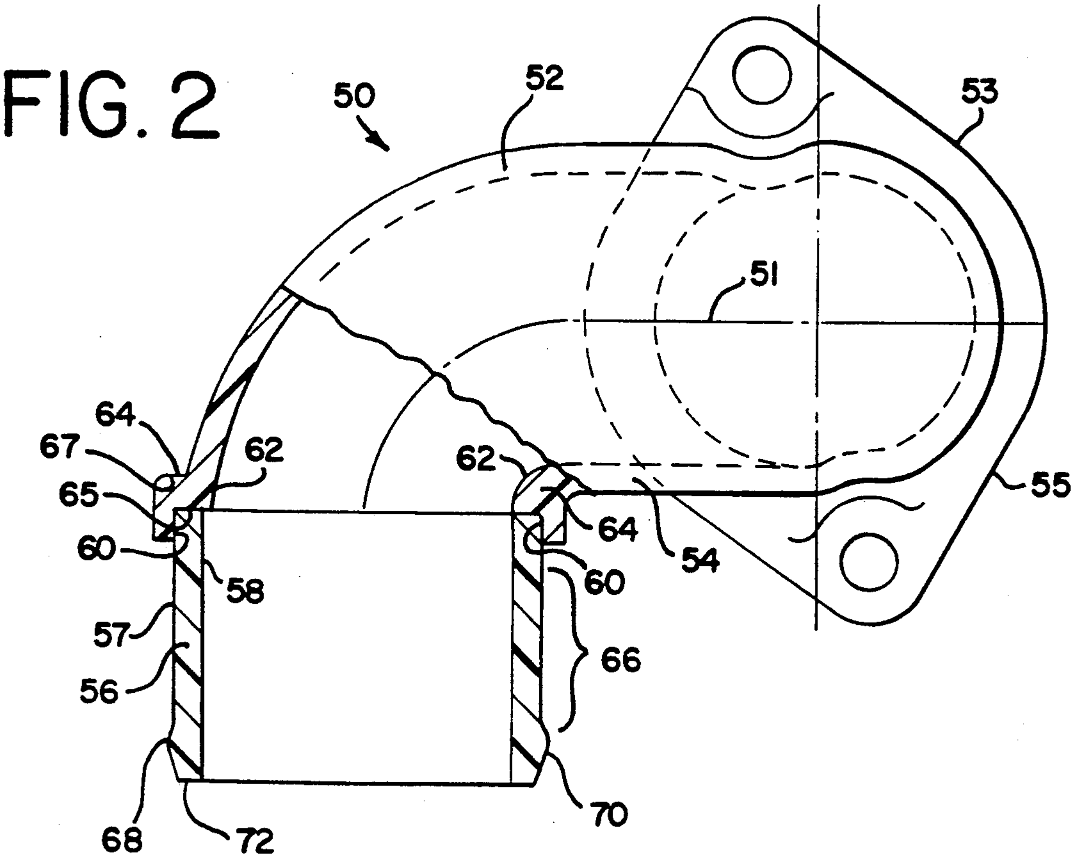
FIG. 2 is a plan view partly in section of a complete foam pattern formed from three sections used in forming the slurry mold for the cast structure, including the cast hose connection element of FIG. 1.

Referring now to FIG. 2, there is illustrated a polystyrene pattern 50, formed in accordance with the teachings of the present invention, which is utilized to create the cast structure 10. Unlike previous casting patterns of this type, the pattern 50 is formed from three sections, not two. The body portion of pattern 50 is formed from two mating (along line 51) curved semicylindrical body pattern sections 52 and 54, including mounting flange halves 53 and 55 respectively on one end, with a pattern section 56 for the hose connection element 20, formed as a single, seamless structure, disposed at the other end. To provide for attachment of the hose connection element pattern section 56, each of the body pattern sections 52 and 54 is provided with half of an annular recess 60 on the inner periphery 62 at the end 64 thereof to form half of a socket within which the pattern section 56 for the hose connection element 20 will seat against abutment surface 65, as shown.

The pattern sections 52 and 54 further include a distal flange 67 flaring radially outwardly from the outer surface of each pattern section 52, 54, such flange 67 eventually forming the hose abutment flange 28 of the cast structure 10.

The pattern section 56 for the hose connection element 20 is a cylinder having an outer diameter 57 equal to the inner diameter of socket 60 in patterns 52, 54 and an inner diameter 58 preferably at least as large as the inner diameter 62 of the body portion. Adjacent an end 72 thereof, the outer diameter of pattern section 56 is provided with an annular protruberance 70 defining the hose bead 26 in the finished casting 10. Between the protruberance 70 and the opposite end, the pattern section 56 is provided with a smooth uninterrupted surface 66 corresponding to the hose sealing surface 25 in the finished casting.

After the pattern sections 52, 54, and 56 have been molded as will be described hereinafter, the two body pattern sections 52 and 54 are glued together along longitudinal end edges thereof as at 51 and the pattern section 56 for the hose connection element 20 is then seated against abutment 65 within the circular socket formed by the joined recesses 60 and glued in place, thereby forming the pattern 50 for the entire cast structure 10.

Figure 3:
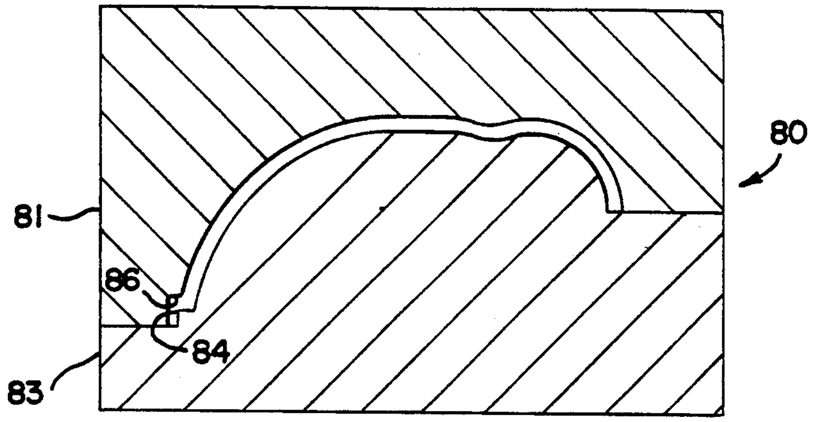
FIG. 3 is a section of a first tooling element used to form a first body forming section of the foam pattern of FIG. 2.
Figure 4:
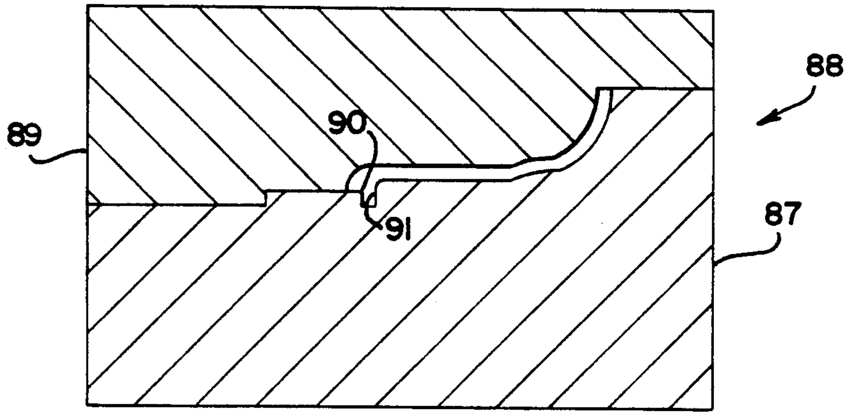
FIG. 4 is a section of a second tooling element used to form a second body forming section of the foam pattern of FIG. 2; and, FIG. 5 is a section of a third tooling element used to form the pattern section for the hose connection element of FIG. 2.
Figure 5:
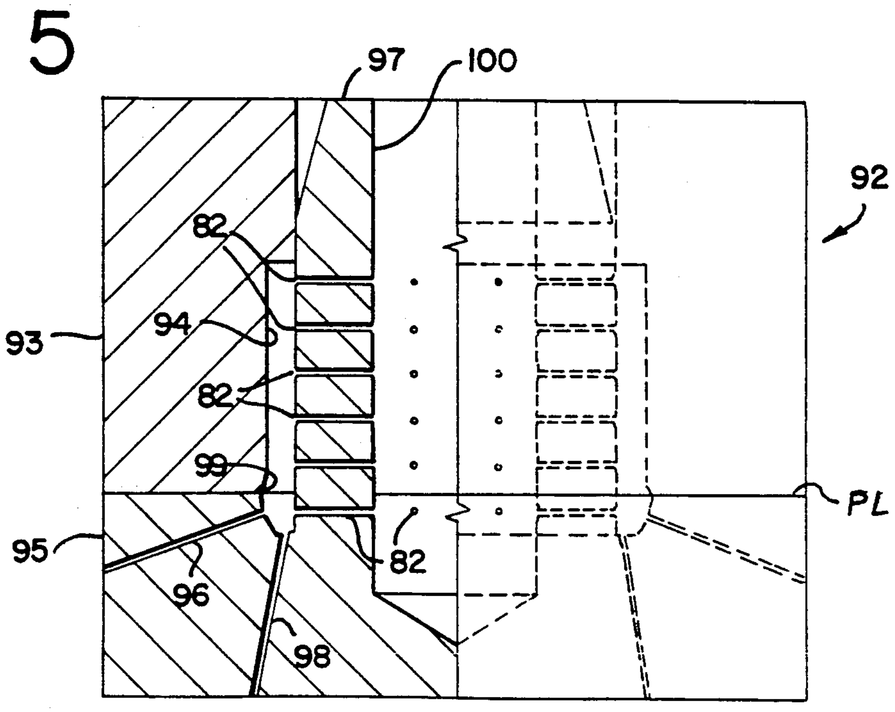

Turning now to FIGS. 3-5, which are sectional views of the tooling elements, it will be understood that the tooling elements illustrated, when viewed from an engineering standpoint, are two separable mold half dies defining the "neqatives" between which the pattern sections 52, 54, and 56, the engineering "positives", will be formed. In order for air to be ventable throughout the interior hollow areas between the confines of the walls of these tooling elements to permit blowing the polystyrene beads into the cavities formed therein, vent openings are provided in the walls of each of the tooling elements. For clarity purposes, the vent openings 82 are shown only in FIG. 5.

In FIG. 3, a tooling element 80 is shown which is used to create the body foam pattern section 52 defined above. As illustrated in section, the tooling element 80 comprises a pair of mold half dies 81, 83 which are provided on all mold surfaces with vent openings. The die 83 is further provided with a projection 84 which is surrounded by a flange forming recess portion 86 in the die 81 to define the flange 64 of pattern section 52.

FIG. 4 illustrates a second tooling element 88 within which will be created the body foam pattern section 54 defined above. The tooling element 88 comprises a pair of mold half dies 87, 89 which are provided on all mold surfaces with vent openings. The die 87 is further provided with a projection 90 which is surrounded by a flange forming recessed portion 91 to define the flange 64 of pattern section 54.

In FIG. 5, there is illustrated a tooling element 92 comprising mold half dies 93, 95 which are utilized to create the pattern section 56 for the hose connection element 20 defined with reference to FIG. 2. As shown, the interior surface 94 of the mold half die 93 which defines the sealing surface portion 66 of outer diameter 57 of pattern section 56 contains no vent holes and is uninterrupted. Adjacent the lower end of die 93, the interior surface 94 further contains the upper portion of an annular depression 99 defining the protruberance 70 in the pattern section 56. The lower mold half die 95 is provided with an inner-diameter-forming cylindrical core 97 having a mold surface containing vent passages 82 opening to the hollow interior portion 100 of core 97.

The parting line PL between the mold die halves 93, 95 intersects the annular depression 99 so as to be disposed on the crest 68 of hose retainer bead forming protuberance 70 extending around the circumference of the pattern section 56, thereby eliminating any potential seam line from the hose sealing surface forming portion 66 thereof, although the inner core 97 of die 95 extends past the parting line. Accordingly, the die half 95 contains the lower portion of annular depression 99 adjacent the parting line. Additional vent openings 96 may be provided on the annular depression 99 in die 95. Optionally, vent openings or a segmented ring vent 98 could be provided in the mold die half 95 along an area against which the end edge 72 of pattern section 56 would be formed.

In this manner, an uninterrupted, flawless external hose sealing surface forming portion 66 will be provided for the pattern section 56 so that when the pattern section 56 for the hose connection element 20 is created therefrom, the as cast hose sealing surface 25 of the hose connection element 20, which duplicates the surface of the pattern section 56, will be flawless, free of glue joint beads and dimples thereon, providing an essentially leak-free hose sealing surface 25 against which a hose to be connected thereover can be sealed.

After a gating (not shown) has been glued onto the assembled pattern 50, the completed pattern-gating assembly (not shown) is then ready to be dipped into a clay slurry, dried, inserted into a casting flask, and the casting process is performed according to the prior method described above.

From the foregoing description it will be apparent that the hose connection element 20, the method of forming same, and the tooling elements 80, 88 and 92 of the present invention provide a number of advantages, some of which have been described above and others of which are inherent in the invention. Also, various modifications can be made to the hose connection element 20, method, and tooling elements 80, 88 and 92 disclosed without departing from the teachings of the present invention. Accordingly the scope of the invention is only to be limited as necessitated by the accompanying claims.

What is claimed is:

1. A set of three tooling elements for use in creating a polystyrene pattern of a tubular cast structure including an integral hose connection element, said tooling element comprising a first mold half die set defining a first pattern cavity for a first half of a body portion of the cast structure, a second mold half die set defining a second pattern cavity for a second half of the body portion of the cast structure, each of said first and second pattern cavities including a projection along a distal peripheral edge thereof defining half of a socket depression in said body portion; and a third mold die set configured to create a pattern for a hose connection element of said cast structure, said third mold die set defining a cylindrical cavity including an outer wall, said outer wall having an annular cavity therein adjacent to one end thereof, and an inner wall defined by a core structure in said third mold die set, said outer wall being free of vent openings therein between said annular cavity and an opposite end of said cylindrical cavity, and said inner wall defining portion of said core structure including vent openings therein, said third mold die set having its parting line intersecting said annular cavity.

2. The set of tooling elements of claim 1 wherein said third mold die set includes vent opening on said one end of said cylindrical cavity.

3. The set of tooling elements of claim 1 wherein a radius of said opposite end of said outer wall of said third mold die set is approximately equal to a radius of each socket depression defining projection in each of said first and second mold half die sets.

4. The set of tooling elements of claim 3 wherein each of said first and second mold half die sets includes flange forming structure at said edge of said first and second pattern cavities in the area surrounding the projection.

5. The set of tooling elements of claim 4 wherein said flange forming structure extends radially outwardly and has an inner radius greater than the outer wall radius of said third mold die set.

6. A tooling element for use in forming a rigid lost foam casting pattern for a hose connection element of a casting comprising a mold die set defining a cylindrical cavity including an outer wall, said outer wall having an annular cavity therein adjacent to one end thereof, and an inner wall defined by a core structure in said die set, said mold die set having its parting line intersecting said annular cavity, said outer wall being free of vent openings therein between said annular cavity and an opposite end of said cylindrical cavity, and said inner wall defining portion of said core structure including vent openings therein.

* * * * *